United States Patent
Hata et al.

(10) Patent No.: US 8,433,099 B2
(45) Date of Patent: Apr. 30, 2013

(54) VEHICLE DISCRIMINATION APPARATUS, METHOD, AND COMPUTER READABLE MEDIUM STORING PROGRAM THEREOF

(75) Inventors: Sahoko Hata, Oita (JP); Atsuyoshi Ando, Oita (JP); Kenji Kodama, Oita (JP); Takako Shinjo, Oita (JP); Kunikazu Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 892 days.

(21) Appl. No.: 12/266,388

(22) Filed: Nov. 6, 2008

(65) Prior Publication Data

US 2009/0060279 A1    Mar. 5, 2009

Related U.S. Application Data

(63) Continuation of application No. PCT/JP2007/060679, filed on May 25, 2007.

(30) Foreign Application Priority Data

May 26, 2006    (JP) .................................. 2006-147240

(51) Int. Cl.
*G06K 9/00*    (2006.01)
*G06K 9/34*    (2006.01)

(52) U.S. Cl.
USPC ........... 382/104; 382/199; 382/171; 382/173; 382/174

(58) Field of Classification Search .................. 382/104, 382/199, 171, 173, 174
See application file for complete search history.

(56) References Cited

U.S. PATENT DOCUMENTS

| 4,737,847 | A | 4/1988 | Araki et al. | |
| 5,845,007 | A | 12/1998 | Ohashi et al. | |
| 2003/0086614 | A1* | 5/2003 | Shen et al. | 382/199 |
| 2004/0208364 | A1* | 10/2004 | Haque et al. | 382/171 |
| 2005/0169530 | A1 | 8/2005 | Nakai et al. | |
| 2010/0303363 | A1* | 12/2010 | Fedorovskaya et al. | 382/199 |

FOREIGN PATENT DOCUMENTS

| JP | A 62-222391 | 9/1987 |
| JP | A 6-309588 | 11/1994 |
| JP | A 8-55294 | 2/1996 |
| JP | 2000-503145 | 3/2000 |

(Continued)

OTHER PUBLICATIONS

NPL—Canny Edge Detector Explained.*

(Continued)

*Primary Examiner* — Chan S Park
*Assistant Examiner* — Ha Le
(74) *Attorney, Agent, or Firm* — Greer, Burns & Crain, Ltd.

(57) ABSTRACT

The pixels located at equal intervals in a shot image are converted into intensity components and applied with a differential filter. The number of the obtained variations that have values larger than or equal to a certain value among the obtained variations is counted. Then discrimination of a vehicle shot in the target image is executed on the basis of the counted value. The counted value varies depending on a size of a shot object in a shot image. The counted value is large when an occupied area of the object is large, and the counted value is small when the occupied area of the object is small. By so doing, it is advantageously possible to properly discriminate a vehicle.

12 Claims, 10 Drawing Sheets

FOREIGN PATENT DOCUMENTS

| JP | A 2000-149181 | 5/2000 |
| JP | A 2001-216598 | 8/2001 |
| JP | 2002008186 A * | 1/2002 |
| JP | A 2002-8186 | 1/2002 |
| JP | B2 3453952 | 10/2003 |

OTHER PUBLICATIONS

Huang et al.; "A Vision-Based Vehicle Identification System;" Pattern Recognition, 2004; ICPR 2004; Proceedings of the 17$^{th}$ International Conf. on Cambridge, UK Aug. 23-26, 2004; Piscataway, NJ; IEEE vol. 4, pp. 364-367.

Lai et al.; "Vehicle Type Classification From Visual-Based Dimension Estimation;" Intelligent Transportation Systems, 2001; Proceedings, 2001 IEEE; Aug. 25-29, 2001; Piscataway, NJ; IEEE pp. 201-206.

Gupte et al.; "Detection and Classification of Vehicles;" IEEE Transactions on Intelligent Transportation Systems, IEEE Service Center, Piscataway, NJ; vol. 3, No. 1, Mar. 1, 2002; p. 37-47.

Japanese Office Action issued in corresponding Japanese App. No. 2006-147240, dated Sep. 30, 2011.

* cited by examiner

VEHICLE DISCRIMINATION APPARATUS, METHOD, AND COMPUTER READABLE MEDIUM STORING PROGRAM THEREOF

This application is a Continuation of International Application No. PCT/JP2007/060679, filed May 25, 2007.

BACKGROUND

1. Field

The present invention relates to an apparatus that discriminates a vehicle on the basis of a shot image of the vehicle by using information processing technologies.

2. Description of the Related Art

Japanese Laid-open Patent Publication No. 2000-149181 discusses a traffic flow measurement system that includes a camera for acquiring continuous images by successively taking pictures of a road surface and a vehicle that passes a set area on the road surface; a luminance histogram calculation means for obtaining a luminance histogram for each of the continuous images through calculation; a difference calculation means for calculating differences of time-series of the luminance histograms; a saving means for saving the luminance histogram that does not vary for a fixed time as road surface data; a difference calculation means for calculating, when the luminance histograms vary during the fixed time, a difference between two preceding and subsequent luminance histograms; and a vehicle detection means for discriminating the existence of a vehicle by comparing the difference with a preliminarily set threshold. The traffic flow measurement system extracts a moving object in a moving image by using a difference method and performs pattern matching thereon to determine whether it is a two-wheeled vehicle. This technology may not be applied on a still image.

Japanese Laid-open Patent Publication No. 2002-8186 discusses a vehicle type identification device that includes a profile line extraction means extracting a profile line of a vehicle by differentiating image data of the vehicle to be identified; a feature quantity extraction means extracting a feature quantity of the profile line extracted by the profile line extraction means, by calculating the frequency of component in a specified extracting direction of the profile line in the specified area; a storage means storing a previously acquired reference feature quantity of a vehicle, which is an identification reference, and the information indicating a vehicle type in the state of being related to each other; and a feature quantity matching means identifying the vehicle type of the vehicle to be identified, by matching the feature quantity extracted by the feature quantity extraction means and the reference feature quantity stored in the storage means with each other. The vehicle type identification device extracts a profile line of a vehicle and a feature quantity of the profile line then matches the feature quantity with a previously acquired reference feature quantity to identify a vehicle type. This technology may not be effective for a small vehicle such as a two-wheeled vehicle.

Japanese Patent No. 3453952 discusses a traffic flow measurement instrument that includes an image input means that holds an input on-road image obtained from a television camera; an image analyzing means that analyzes a luminance distribution of the on-road image; a vehicle tracing means that traces a vehicle by performing pattern matching on a template segmented from sequentially input on-road images; a vehicle determination means that calculates a tracing distance of the vehicle on the basis of the result of the pattern matching and, when a value of the calculation result is larger than a predetermined value, determines that it is a passing vehicle; a vehicle type determination means that, when it is determined to be a passing vehicle, differentiates an image in a previously determined vehicle type determination area in a vertical direction, that projects the differentiated image in a horizontal direction to acquire added waveform, that selects two peaks of the waveform, which are located farthest from each other, that registers two templates on the basis of a coordinate in the vertical direction of each of the selected two peaks, that calculates a projected length, which is obtained by projecting a vehicle front end portion on a road on the basis of a difference between the two templates in center coordinates, that determines the height of the vehicle on the basis of the rate of change in the calculated projected lengths at multiple points, and that determines the type of the vehicle on the basis of the determined height. The traffic flow measurement instrument recognizes a vehicle by pattern matching to trace the vehicle on the basis of a template segmented from a moving image. This technology may not be applied on a still image.

SUMMARY

It is an object of the present invention to provide a vehicle discrimination apparatus that is able to perform discrimination at high speed when a large amount of still image data of vehicles is discriminated into vehicle types.

According to an aspect of the present invention, provided is a vehicle discrimination apparatus for discriminating a vehicle on the basis of an image of the vehicle. The vehicle discrimination apparatus includes a feature extractor, a differential filter applier, and a vehicle discriminator. The feature extractor extracts intensity components of pixels corresponding to grid points previously set on the image and neighboring pixels thereof. The differential filter applier applies a differential filter on values of the intensity components extracted by the feature extractor to obtain variations in the intensity components of pixels corresponding to the grid points. The vehicle discriminator discriminates the vehicle on the basis of data derived from the variations obtained by the differential filter applier.

The vehicle discrimination apparatus may further include a ratio calculator for calculating a specific vertically projected value ratio. The ratio calculator accumulates along vertical grid lines the variations obtained by the differential filter applier to obtain vertically projected values, extracts a pre-defined number of the vertically projected values in descending order, accumulates, among the vertically projected values extracted, the vertically projected values accumulated along adjacent vertical grid lines to obtain a specific vertically projected value, and obtains, as the specific vertically projected value ratio, a ratio of the specific vertically projected value against an accumulated value of variations in the intensity components of pixels corresponding to all the grid points. In such a configuration, the vehicle discriminator may discriminate the vehicle on the basis of the specific vertically projected value ratio calculated by the ratio calculator. In particular, the vehicle discriminator may discriminate that the vehicle is a two-wheeled vehicle when the specific vertically projected value ratio calculated by the ratio calculator is larger than or equal to a predefined ratio threshold.

The vehicle discrimination apparatus may further include a number calculator for calculating a specific variation number by counting the number of variations having values larger than or equal to a predefined first threshold among the variations obtained by the differential filter applier. In such a configuration, the vehicle discriminator may discriminate the vehicle on the basis of the specific variation number calculated by the number calculator as well as the specific vertically projected value ratio calculated by the ratio calculator. In particular, the vehicle discriminator may discriminate that the vehicle is a two-wheeled vehicle when the specific vertically projected value ratio calculated by the ratio calculator is larger than or equal to a predefined ratio threshold, and that the vehicle is a four-wheeled vehicle when the specific variation number calculated by the number calculator is larger than or equal to a predefined second threshold.

DESCRIPTION OF THE PREFERRED EMBODIMENTS

Figure 1:
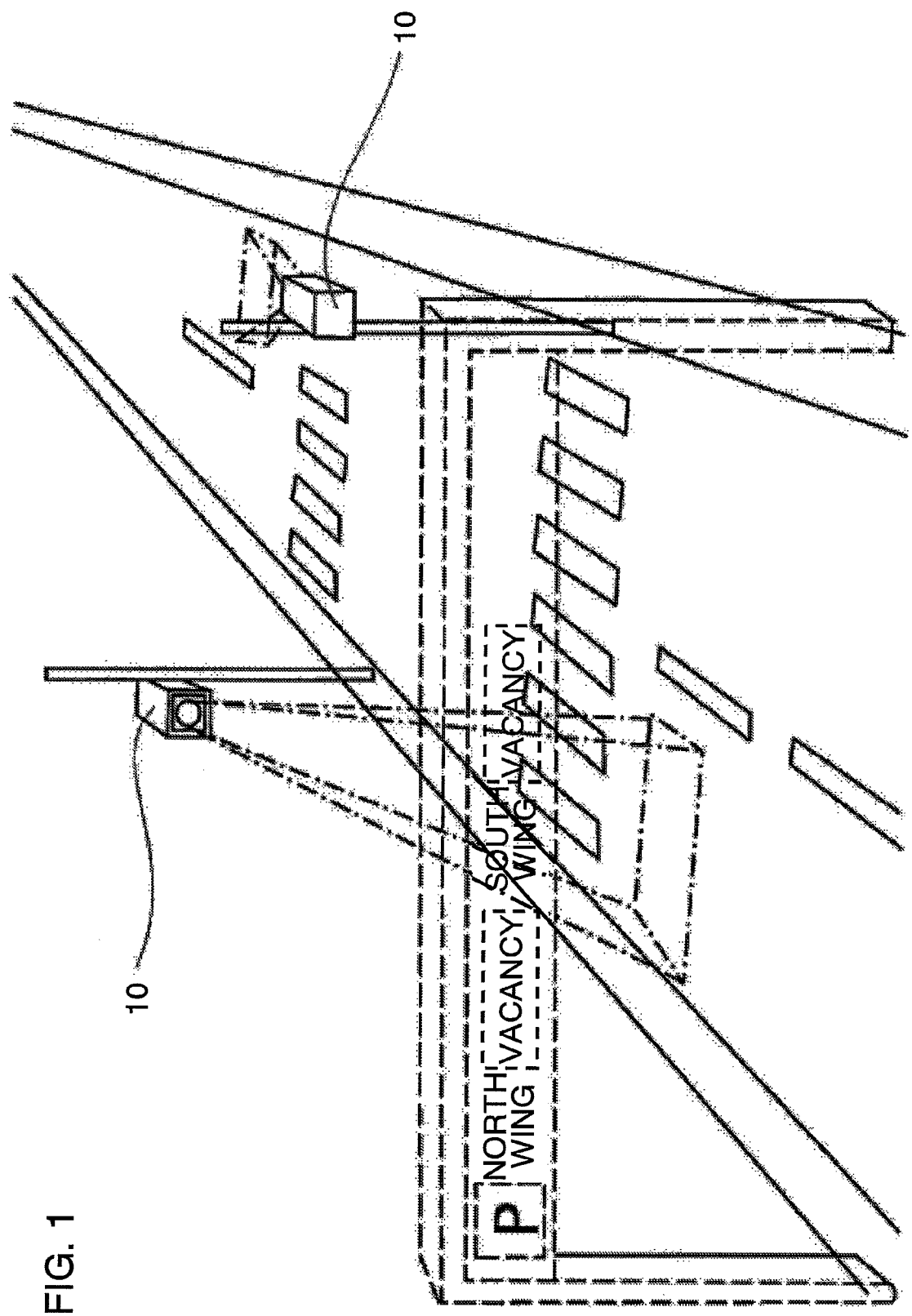
FIG. 1 is a diagram illustrating a shooting environment according to a first embodiment of the present invention.

Generally, in image recognition, a differential filter is used for contour extraction or the like and applied to all the pixels in the image.

A four-wheeled vehicle is formed of many components having a complex shape and, therefore, has a group of complex edges. On the other hand, a two-wheeled vehicle occupies a small percentage of area in the image, and has a limited number of edges as compared to a four-wheeled vehicle.

Thus, it is possible to extract features of a group of edges in an image of a four-wheeled vehicle or an image of a two-wheeled vehicle without applying the differential filter over the entire image.

In embodiments of the present invention, a differential filter is applied to I-components in HSI (Hue, Saturation, Intensity) of the image at the vertices of grids (n lines in a horizontal direction and n lines in a vertical direction), and calculated values of intensity of the image obtained thereof are used to discriminate an image of a two-wheeled vehicle from an image other than that. Thus, it is possible to achieve high speed processing of that process as follows:

(1) An RGB histogram of a color still image including a shot vehicle is extracted, and I-components (intensity) in HSI are calculated from the RGB.

(2) The differential filter is applied to the calculated I-components to obtain variations in depth in the image. At this time, the differential filter is only applied to the vertices of the grids specified on the image, that is, the intersections of the grid lines that form the grids.

(3) Each image is divided into three areas, that is, left end, center, and right end, and then a ratio of the entire variation of each area against the entire variation of the entire area is obtained for each image (4) When the number of variations that are larger than a first threshold is smaller than a second threshold and when the above variation ratio satisfies a predetermined condition, it is discriminated as a two-wheeled vehicle. Other than that, it is discriminated as a vehicle other than a two-wheeled vehicle.

By applying a smoothing process to the variations in depth (intensity) obtained in (2), it is possible to smooth the variations to remove noise.

The "first threshold" is generally set between a value of a variation that is obtained at a position where any object is not shot in the target image and a value of a variation that is obtained at a position where some object is shot in the target image. Because the values of variations vary depending on a shooting environment, it is preferably set at the time of constructing the device.

Objects that the imaging device shoots include various types; however, in view of an area that occupies a shot image, the number of variations greatly differs between a four-wheeled vehicle and an object other than that. Even a light car that is the smallest among four-wheeled vehicles may be larger than a motorcycle that is regarded to be the largest among objects other than four-wheeled vehicles. That is, it is advantageous that, as the number of variations is largely different between a four-wheeled vehicle and an object other than that, discrimination of them may be easily and accurately performed.

Thus, the "second threshold" is generally set between the number of variations when the object in the target image is a four-wheeled vehicle and the number of variations when the object in the target image is an object other than a four-wheeled vehicle. Because the value of the number of variations varies depending on a shooting environment, it is preferably set at the time of constructing the device.

In the following embodiments, like reference numerals are assigned to like components.

First Embodiment

FIG. 1 is a diagram illustrating a shooting environment according to a first embodiment of the present invention. In the first embodiment, imaging devices 10 are arranged at sides of a road laid out in a factory site, and a vehicle discrimination apparatus 200 is arranged in a main building of the factory. A shot image that is shot by each imaging device 10 is transmitted to the vehicle discrimination apparatus 200 through a communication channel that connects the imaging devices 10 with the vehicle discrimination apparatus 200. The vehicle discrimination apparatus 200 executes information processing on the received shot image and then outputs a vehicle discrimination result. Vehicle discrimination results are counted by a management computer 30 that is operated by an administering person, and the number of vehicles entered in the site is separately displayed for four-wheeled vehicle and two-wheeled vehicle. These pieces of information may be used, for example, for security measures and may also be used when designing an additional factory facility.

Figure 2:
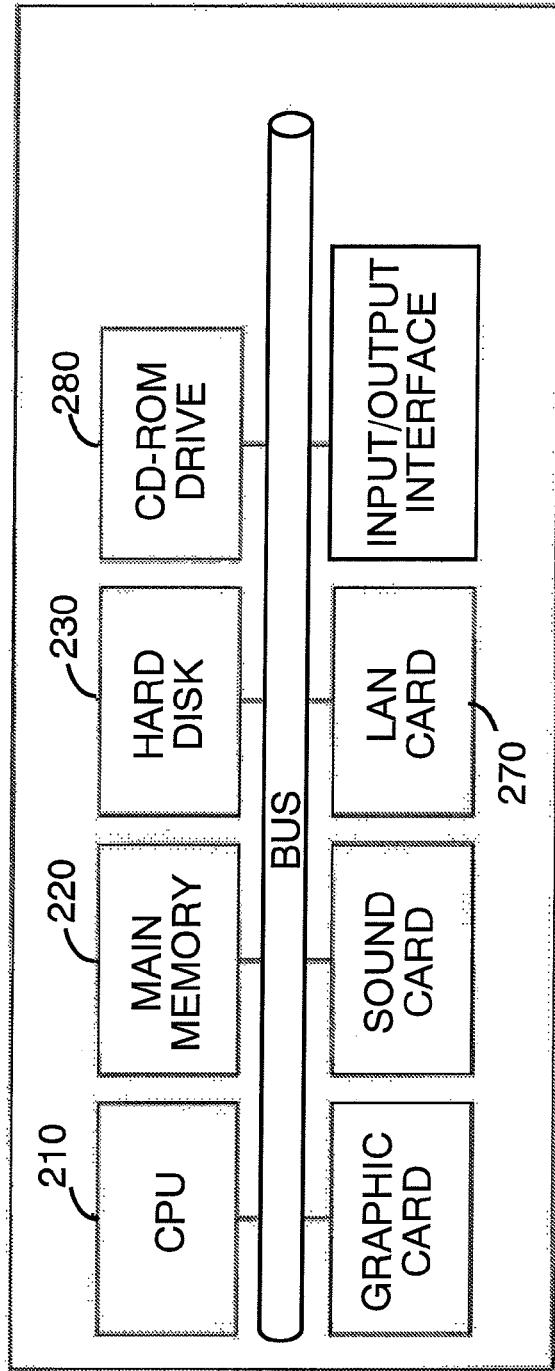
FIG. 2 is a diagram illustrating a system configuration and a hardware configuration of a vehicle discrimination apparatus according to a first embodiment of the present invention.
Figure 2:
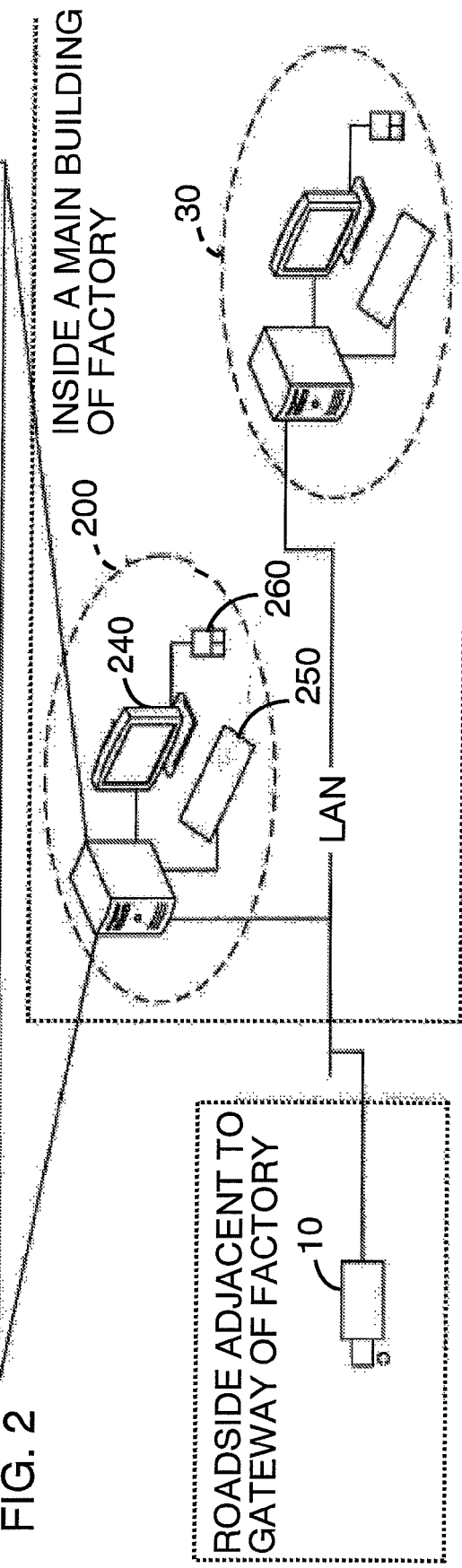

FIG. 2 is a diagram illustrating a system configuration and a hardware configuration of a vehicle discrimination apparatus according to a first embodiment of the present invention. The hardware configuration of the vehicle discrimination apparatus 200 is a typical computer configuration, and includes a CPU (Central Processing Unit) 210, a main memory 220 such as a DRAM (Dynamic Random Access Memory), a hard disk 230 which is an external storage device, a display unit 240 which is a display device, a keyboard 250 and a mouse 260 which are input devices, and a LAN card 270 which is an expansion card for connection with a network, a CD-ROM drive 280, and the like. That is, a vehicle discrimination program stored in a storage medium such as a CD-ROM or a vehicle discrimination program transmitted from another computer through a network is installed to be copied in a hard disk 230 of the computer so as to be appropriately readable onto the main memory 220. Thus, the typical computer constitutes a vehicle discrimination apparatus. Note that specialized hardware for a vehicle discrimination apparatus, not a typical computer, may also be used to constitute a vehicle discrimination apparatus. Specifically, the logic on a vehicle discrimination apparatus may be implemented with an ASIC (Application Specific IC) to constitute a vehicle discrimination apparatus using a system LSI together with a plurality of LSIs such as memories.

As well as the vehicle discrimination apparatus 200, the hardware configuration of the management computer 30 is a typical computer configuration. Here, the vehicle discrimination apparatus 200 and the management computer 30 may be constructed on the same computer.

Figure 3:
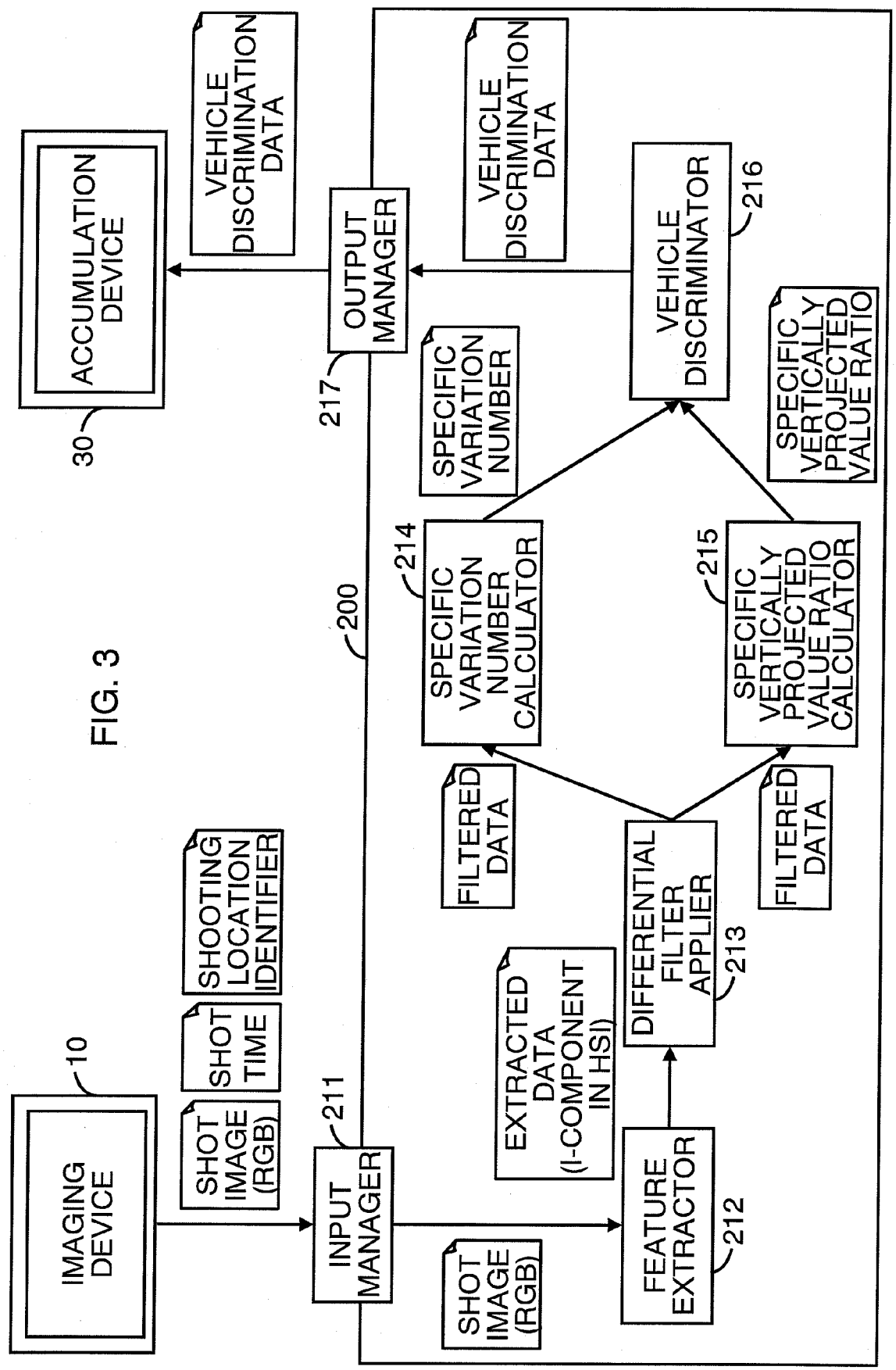
FIG. 3 is a diagram illustrating a block configuration of a vehicle discrimination apparatus according to a first embodiment of the present invention.

FIG. 3 is a diagram illustrating a block configuration of a vehicle discrimination apparatus according to a first embodiment of the present invention. The vehicle discrimination apparatus 200 includes an input manager 211, a feature extractor 212, a differential filter applier 213, a specific variation number calculator 214, a specific vertically projected value ratio calculator 215, a vehicle discriminator 216, and an output manager 217. The input manager 211 captures a shot image from the imaging devices 10. The feature extractor 212 converts the shot image in RGB format into HSI to extract I-components. The differential filter applier 213 applies a differential filter to only specific points on the extracted data including only I-components in HSI format. The specific variation number calculator 214 calculates the number of variations that constitute filtered data and are larger than or equal to a first threshold. The specific vertically projected value ratio calculator 215 accumulates the variations that constitute filtered data of the same position in horizontal direction in the shot image data and that, among the accumulated values, further accumulates accumulated values that satisfy a specific condition to obtain a specific vertically projected value and divides the specific vertically projected value by an accumulated value of the entire variation to obtain a ratio of the specific vertically projected value. The vehicle discriminator 216 discriminates whether a vehicle that is shot in the shot image data currently targeted is a four-wheeled vehicle or a two-wheeled vehicle on the basis of whether the obtained number of specific variations and the obtained ratio of the specific vertically projected value satisfy a predetermined condition. The output manager 217 outputs vehicle discrimination data. The block configuration diagram herein is an example, and, needless to say, a so-called person skilled in the art is able to appropriately carry out design changes to modify the block configuration without changing the essential portions of the present invention. That is, this is because how the functional blocks are understood varies depending upon an implementer, an implementing environment, and specifications.

Figure 4:
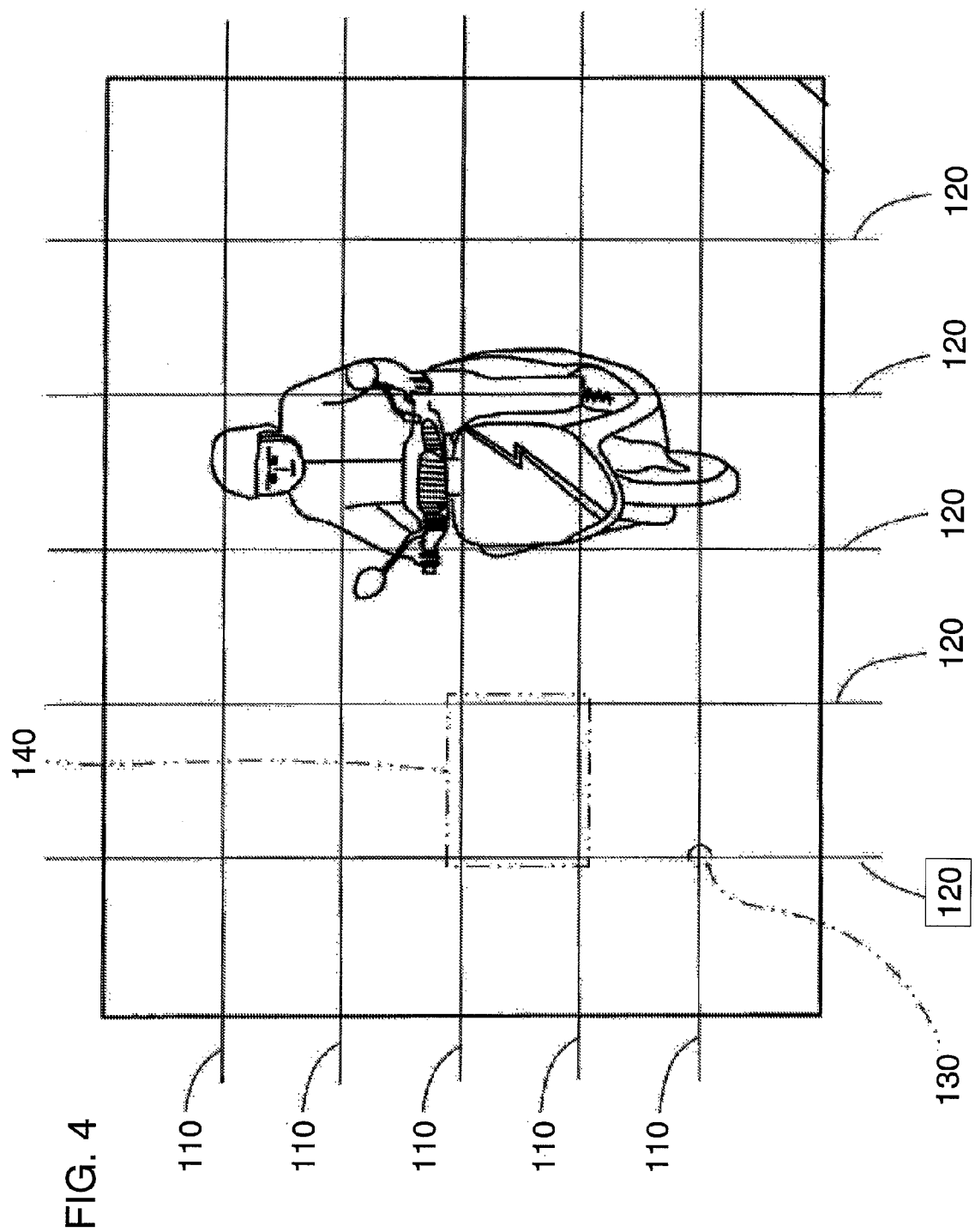
FIG. 4 is a diagram illustrating a shot image (when an image of a two-wheeled vehicle is shot) that is shot by an imaging device according to a first embodiment of the present invention.
Figure 5:
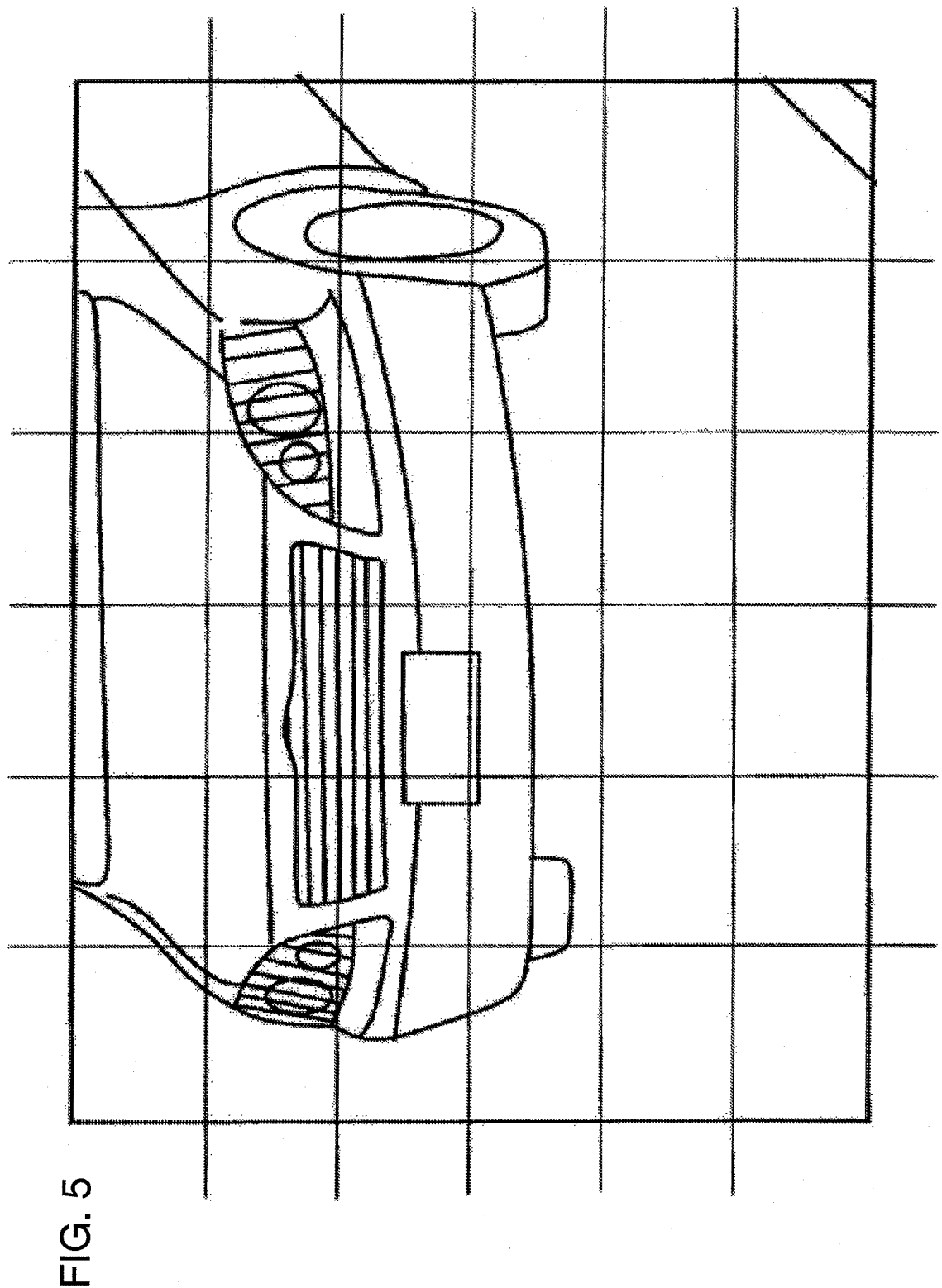
FIG. 5 is a diagram illustrating a shot image (when an image of a four-wheeled vehicle is shot) that is shot by an imaging device according to a first embodiment of the present invention.

Two imaging devices 10 are provided. One of them shoots a predetermined range toward an entering direction in order to get an image of an entering vehicle, while the other shoots a predetermined range toward an exiting direction in order to get an image of an exiting vehicle. FIG. 4 is a diagram illustrating a shot image (when an image of a two-wheeled vehicle is shot) that is shot by an imaging device according to a first embodiment of the present invention. FIG. 5 is a diagram illustrating a shot image (when an image of a four-wheeled vehicle is shot) that is shot by an imaging device according to a first embodiment of the present invention. The imaging device corresponds to, for example, a CCD camera. In FIG. 4, horizontal grid lines 110 and vertical grid lines 120 are drawn on the shot image. Intersections of the horizontal grid lines 110 and the vertical grid lines 120 correspond to grid points 130, and adjacent four grid points 130 form a grid 140. The same applies to FIG. 5.

The technology used by the feature extractor 212 for converting a shot image from an RGB format into an HSI format is a known and conventional technology, and a detailed discussion thereof is omitted.

Because the feature extractor 212 needs to obtain only I-components, among H-components, S-components, and I-components in the HSI format, H-components and S-components need not be obtained. Not obtaining these components allows avoiding an unnecessary calculation process.

In addition, it is not necessary to obtain I-components of all the pixels of shot image data, but, at least, necessary to obtain only I-components of the pixels required to apply the differential filter. The least number of I-components depends on the size of the differential filter. A 3 by 3 matrix differential filter requires I-components of five pixels in total for each target point, that is, vertical three pixels and horizontal three pixels, including the target point. Generally, an n by n matrix differential filter requires (2n−1) I-components. Of course, when a required I-component is overlapped, it is not necessary to calculate I-component thereof repeatedly.

In the first embodiment of the present invention, the target points are vertices of a plurality of grids formed by vertical grid lines and horizontal grid lines shown in FIG. 4 or FIG. 5. By so doing, it is possible to arrange target points at equal intervals in a shot image. Although the number of vertical grid lines and the number of horizontal grid lines are five, respectively, in FIG. 4 and FIG. 5, the present invention is not limited to them. They may be n, respectively, or may be n and m, respectively.

Of course, the feature extractor may obtain values of intensity components of all the pixels.

A decrease in number of grid lines reduces the number of calculation processes and therefore provides high-speed processing; however, there exists the minimum number of required grid lines. The number of required grid lines varies depending on a shooting environment and will be optimized during operation. It is possible for the operator to manually set it while referencing the percentage of correct discrimination results; however, it is preferable to provide a controller that increases or decreases the number of grid lines from an initial number of grid lines on the basis of a target percentage of correct discrimination results.

The shooting environment includes a surrounding environment (road surface, time (morning, daytime, night, and the like), climate (fine, rainy, cloudy, and the like), season, and the like) in which each imaging device 10 is arranged, a shooting area of each imaging device 10, an imaging performance of each imaging device 10 by itself, and the like. It is preferable to construct and use a neural network, SOM (Self-Organizing Map), or the like, that uses the above parameters as input data and the number of vertical grid lines and the number of horizontal grid lines as output data.

A point having a different differential value is a point at which the depth varies in an image. (As the inclination of a depth value increases, a differential value varies largely.)

The larger the difference at that point is, the more abruptly the depth varies. Thus, it is possible to assume that something other than a road surface is present around the point having that difference.

In a case of a two-wheeled vehicle, because a larger amount of road surface data is present, the number of points at which the depth varies is smaller than in a case of a four-wheeled vehicle. Thus, focusing on the points at which the depth varies, it may be discriminated as a four-wheeled vehicle when the number of these points is larger than a certain value or a two-wheeled vehicle when it is smaller than the certain value.

A differential filter is a filter that converts differential coefficients at each point of image data into a new pixel value. Actually, because of a digital image, differences will be considered. The filter coefficients include a horizontal direction component and a vertical direction component.

The filter coefficient in the horizontal direction is as follows.

$$\begin{pmatrix} -1 & 0 & 1 \\ -2 & 0 & 2 \\ -1 & 0 & 1 \end{pmatrix} \quad (1)$$

The filter coefficient in the vertical direction is as follows.

$$\begin{pmatrix} -1 & -2 & -1 \\ 0 & 0 & 0 \\ 1 & 2 & 1 \end{pmatrix} \quad (2)$$

The first embodiment of the present invention uses an absolute value of the differential coefficient. After the horizontal direction component gh(i,j) and the vertical direction component gv(i,j) are obtained, g(i,j) is obtained as follows.

$$g(i,j) = \sqrt{g_h^2(i,j) + g_v^2(i,j)} \quad (3)$$

The above differential filter is generally called Sobel filter (reference: "Handbook of Image Analysis [Revised Edition]," p. 1231, Mikio TAKAGI, Haruhisa SHIMODA, University of Tokyo Press).

Among the variations of pixels located at grid points, the number of specific variations is counted. The grid points are vertices of grids formed by the vertical grid lines and the horizontal grid lines on the shot image. The specific variations are variations that are larger than or equal to a predetermined threshold. Among the grid points, the points having a variation larger than or equal to a certain value within the shot image may be estimated to be located on a two-wheeled vehicle or four-wheeled vehicle present in the shot image. Then, when comparing the grid points located on a two-wheeled vehicle with the grid points located on a four-wheeled vehicle, because the four-wheeled vehicle occupies a larger area in the shot image than the two-wheeled vehicle, the number of grid points located thereon is also larger. Thus, it is possible to discriminate an object present in the shot image as whether a four-wheeled vehicle or another object on the basis of the number of grid points located thereon.

Discrimination of a vehicle based on the specific variation (first discrimination) may be performed as follows.

The pixels located at equal intervals in a shot image and neighboring pixels thereof are converted into intensity components. A differential filter is applied to the pixels located at equal intervals to obtain variations. The number of the obtained variations that have values larger than or equal to a certain value among the obtained variations is counted. Then discrimination of the vehicle shot in the target image is executed on the basis of the counted value. The counted value varies depending on a size of the shot object in the shot image. The counted value is large when an occupied area of the object is large, and the counted value is small when the occupied area of the object is small. By so doing, it is advantageously possible to properly discriminate a vehicle. It is possible to roughly discriminate a four-wheeled vehicle from an object other than that. Among four-wheeled vehicles, it is possible to discriminate between a large-sized vehicle, a medium-sized vehicle, and a small-sized vehicle. Other than a four-wheeled vehicle, it is possible to discriminate between a motorcycle, a motorbike, a bicycle, a pedestrian, an animal, and the like.

The "neighboring pixels" are pixels around the pixels located at equal intervals respectively in a horizontal direction and vertical direction in the target image and a minimum thereof includes pixels whose values of the intensity components are required by the differential filter applier in the next process. For example, if the differential filter is expressed as a determinant of a 3 by 3 matrix, the values of the intensity components of three pixels in the vertical direction and three pixels in the horizontal direction with respect to each of the middle pixels, which are located at equal intervals in the horizontal direction and vertical direction, respectively, in the target image, are the values of intensity components required by the differential filter applier in the next process. Thus, the "neighboring pixels" are four by excluding the pixels located at equal intervals in the horizontal direction and vertical direction, respectively, in the target image.

A vertically projected value is obtained by accumulating variations of the pixels at the grid points on each vertical grid line in the shot image. Among the vertically projected values, a predetermined number of vertically projected values are accumulated in descending order to obtain a specific vertically projected value. Then, the specific vertically projected value is divided by a total vertically projected value that is obtained by accumulating all the vertically projected values, that is, entire variation, to obtain the ratio of the specific vertically projected value. Note that line segments that pass through the pixels of the vertically projected values that constitute the specific vertically projected value need to be successive. That is, for example, the third vertical grid line and the fourth vertical grid line are successive in a lateral direction and, therefore, vertically projected values of the third vertical grid line and fourth vertical grid line may be accumulated, whereas the first vertical grid line and the third vertical grid line are not successive in the lateral direction and, therefore, vertically projected values of the first vertical grid line and third vertical grid line may not be accumulated unless they are successive together with the second vertical grid line.

When a two-wheeled vehicle that is shot in the shot image is viewed, it overlaps a few vertical grid lines among all the vertical grid lines (first characteristic). On the other hand, when a four-wheeled vehicle that is shot in the shot image is viewed, it overlaps almost all the vertical grid lines among all the vertical grid lines. As discussed above, the number of grid points located on a four-wheeled vehicle is larger than the number of grid points located on a two-wheeled vehicle. In addition, the variations of pixels located on a two-wheeled vehicle or four-wheeled vehicle are larger as compared to a road surface where no object locates. Furthermore, no less than a predetermined amount within the entire variation of the grid points in the shot image is an accumulated value of the variations of the grid points located on an object present in the shot image. Then, in the shot image in which the two-wheeled vehicle is shot as well, no less than a predetermined amount within the entire variation of the grid points is occupied by an accumulated value of the variations of the grid points located on the two-wheeled vehicle (second characteristic).

Thus, on the basis of the first characteristic and the second characteristic, if it satisfies that an accumulated value of the variations of the grid points on a few vertical grid lines from among all the vertical grid lines occupies a predetermined amount within the entire variation of the grid points, it may be estimated to be a two-wheeled vehicle or the like. Conversely, if it is assumed that an object other than the object such as a two-wheeled vehicle is shot, it may be estimated to be a four-wheeled vehicle. Here, it is discussed on the assumption that an object is shot in the shot image; however, when no object is shot in the shot image, the above condition is not satisfied, so that it may be included in an estimated result that it is a four-wheeled vehicle. When such a case is undesirable to be included in an estimated result that it is a four-wheeled vehicle, it may be removed by employing a threshold determination on the value of the entire variation of the grid points. That is, this is because a shot image formed of almost a road surface only and in which no object is shot has a small variation at each grid point and, therefore, the value of the accumulated entire variation is also small. Similarly, it may be determined whether a shot image is formed of a road surface only on the basis of whether the number of specific variations is smaller than or equal to a predetermined value.

Discrimination of a vehicle based on the ratio of the specific vertically projected value (second discrimination) may be performed as follows.

The pixels located at equal intervals in a shot image are converted into intensity components. A differential filter is applied thereto. The obtained variations are accumulated along the vertical grid lines to obtain vertically projected values. A plurality of vertically projected values, of which the vertical grid lines are adjacent and which are larger among the obtained vertically projected values, are accumulated to obtain a specific vertically projected value. Then the specific vertically projected value is divided by the entire variation to obtain a ratio of the specific vertically projected value. The ratio of the specific vertically projected value of an object which is narrow in the width direction may be large, whereas the ratio of the specific vertically projected value of an object which is wide in the width direction may be small. By so doing, it is advantageously possible to correctly discriminate a vehicle. It is possible to roughly discriminate a two-wheeled vehicle from an object other than that. Among two-wheeled vehicles, it is possible to discriminate between a motorcycle, a motorbike, a bicycle, a pedestrian, and an animal. Among four-wheeled vehicles, it is possible to discriminate between a large-sized vehicle, a medium-sized vehicle, and a small-sized vehicle.

As discussed above, objects that the imaging device shoots include various types; however, in view of a length in a width direction with a certain length in a longitudinal direction, the ratio of the specific vertically projected value greatly differs between a two-wheeled vehicle and an object other than that. Even a motorcycle that is the largest among two-wheeled vehicles may be smaller in width than a light car that is regarded to be the smallest among four-wheeled vehicles, and even a bicycle that is the smallest among two-wheeled vehicles may be longer in the longitudinal direction than a pedestrian. That is, it is advantageous that the ratio of the specific vertically projected value is largely different between a two-wheeled vehicle and an object other than that, and discrimination of them may be easily and accurately performed.

Furthermore, the condition for discriminating a two-wheeled vehicle may include a condition that the number of specific variations is smaller than or equal to a fourth threshold. At this time, the fourth threshold is preferably smaller than or equal to the second threshold discussed above.

By using the second discrimination, as discussed above, it is possible to discriminate a shot image, in which a two-wheeled vehicle is shot, at high speed even when a large amount of still image data of vehicles is input to the vehicle discrimination apparatus.

By employing both the first discrimination and the second discrimination, it is possible to discriminate a vehicle further accurately. That is, if the discrimination result in the first discrimination and the discrimination result in the second discrimination are compared and are the same, it is possible to output the discrimination result as a correct result. If the results are different, because one of the discrimination results is probably wrong, it is possible to separately output that discrimination is not determined. Furthermore, the percentage of correct discrimination results may differ between the discrimination results of the first discrimination and the second discrimination depending on the type of a vehicle, such as the percentage of correct discrimination results of the first discrimination is high for a certain type of a vehicle and the percentage of correct discrimination results of the second discrimination is high for another type of a vehicle. Thus, it is possible to preferentially output the result of one that gives the discrimination result having a high percentage of correct discrimination results. For example, when the discrimination result of the first discrimination is a light car and the correctly discriminated percentage of the first discrimination till then for a light car is 95%, whereas the discrimination result of the second discrimination is an ordinary vehicle and the correctly discriminated percentage of the second discrimination till then for an ordinary vehicle is 60%, the discrimination result of the first discrimination may be preferentially output. Furthermore, a condition value that varies over time even in the same shooting environment may also be used as a parameter. For example, it may be configured so that the percentage of correct discrimination results under each climate condition is also recorded and the percentage of correct discrimination results of a climate condition that matches the climate condition at the shot time of the target shot image is read out.

The predetermined condition that the number of specific variations or the ratio of the specific vertically projected value should satisfy in determination by the vehicle discriminator 216 also varies in detail depending on a shooting environment, and it may be set using, as a reference, a predetermined condition discussed below.

As for the predetermined condition, a first condition is that the number of specific variations is larger than or equal to a second threshold and a second condition is that the ratio of the specific vertically projected value is larger than or equal to a third threshold. The predetermined condition is based on the theories discussed above. Satisfaction of the first condition indicates a four-wheeled vehicle, whereas dissatisfaction of the first condition indicates a two-wheeled vehicle or a road surface only. Satisfaction of the second condition indicates a two-wheeled vehicle, whereas dissatisfaction of the second condition indicates a four-wheeled vehicle or a road surface only. A shot image in which a road surface only is shot and no object is shot may be removed through the above discussed method, so that it is possible to discriminate between a two-wheeled vehicle and a four-wheeled vehicle. More precisely, the first condition allows discrimination of a four-wheeled vehicle, the second condition allows discrimination of a two-wheeled vehicle, and the first condition and second condition together allow discrimination between a four-wheeled vehicle and a two-wheeled vehicle.

Here, an object other than a four-wheeled vehicle includes a two-wheeled vehicle (motorcycle, motorbike, or bicycle), and, other than the two-wheeled vehicle, a pedestrian, an animal, and a road surface only. Note that the four-wheeled vehicle in the present invention includes an ordinary vehicle such as a sedan, and a large-sized vehicle such as a bus or a large truck. Needless to say, it includes not only a vehicle for which four tires are provided but also a vehicle for which four or more tires are provided and a vehicle for which four or less tires are provided. The vehicle for which four or more tires are provided is a large truck as an example. The vehicle for which four or less tires are provided is a three-wheeled vehicle as an example. That is, the present invention is able to determine whether a vehicle present in a target image is a vehicle that has an occupied space larger than a predetermined area, and it is possible to interpret a four-wheeled vehicle without departing from the subject matter of the present invention.

In addition, satisfaction of the condition that the number of specific variations is smaller than or equal to the second threshold indicates a pedestrian, an animal, and a road surface only as well as a two-wheeled vehicle, but if the ratio of the specific vertically projected value is larger than or equal to the third threshold, a road surface only may be excluded. Depending on adjustment of the third threshold, it is possible to further specifically discriminate a two-wheeled vehicle.

The "third threshold" is generally set between the ratio of a specific vertically projected value when the object in the target image is a two-wheeled vehicle and the ratio of a specific vertically projected value when the object in the target image is an object other than a two-wheeled vehicle. Because the value of the specific vertically projected value varies depending on a shooting environment, it is preferably set at the time of constructing the device.

Figure 6:
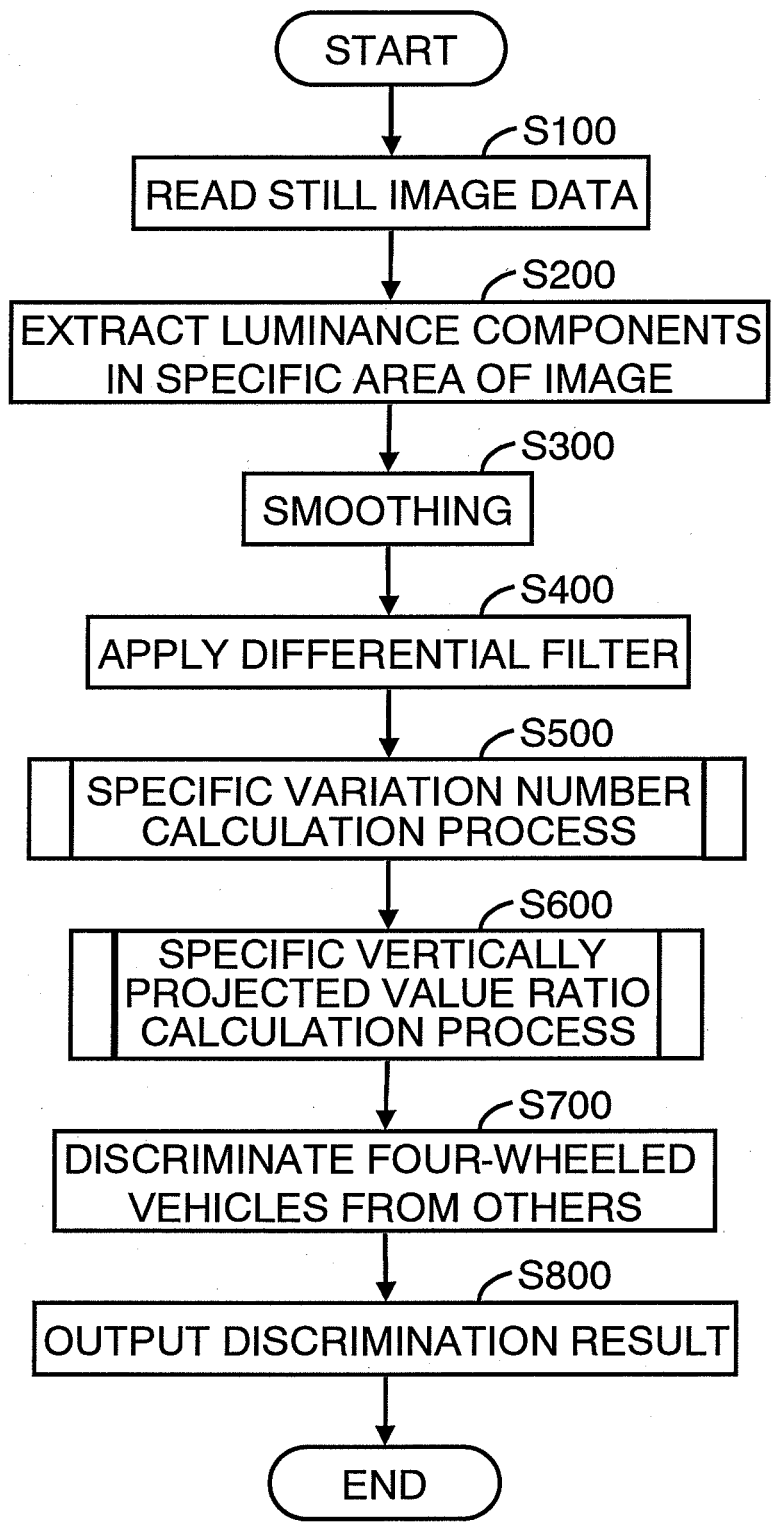
FIG. 6 is a diagram illustrating a flowchart of operations of a vehicle discrimination apparatus according to a first embodiment of the present invention.
Figure 7:
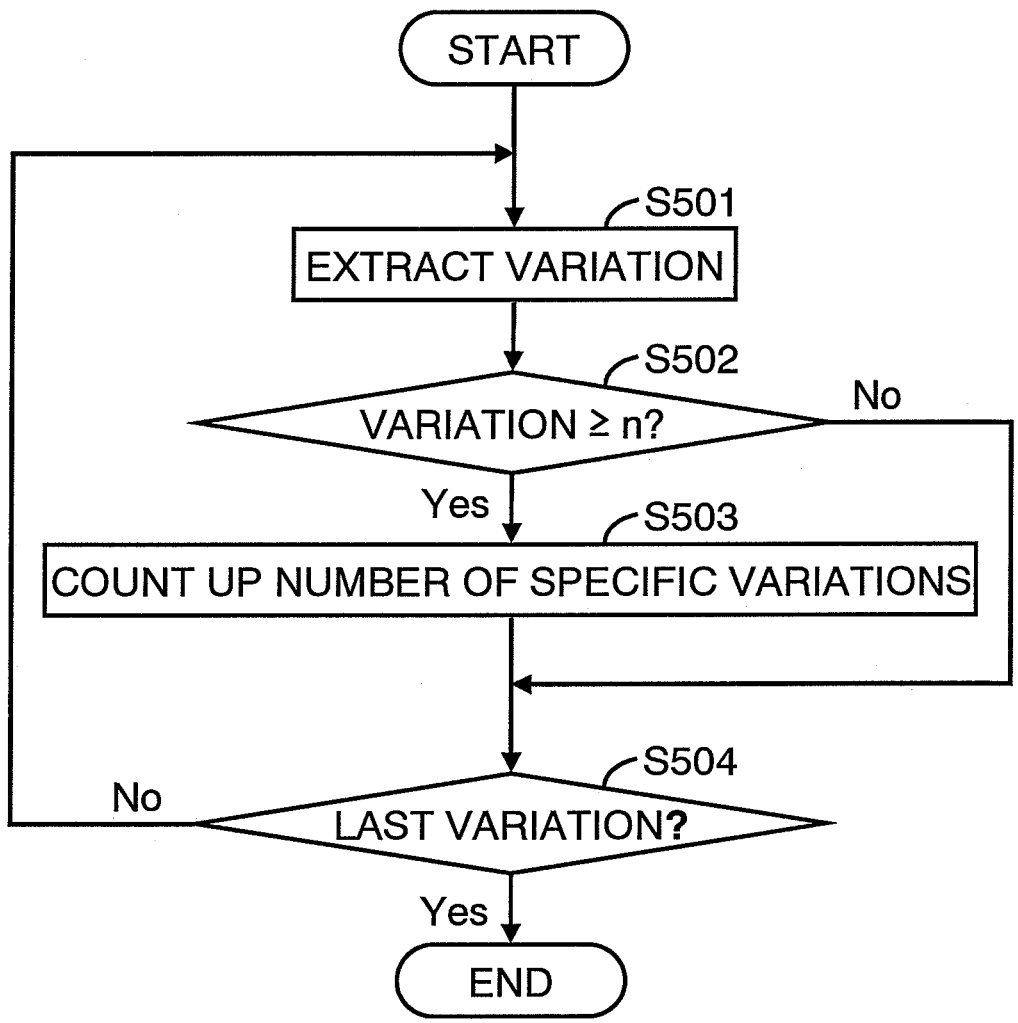
FIG. 7 is a diagram illustrating a flowchart in detail of a specific variation number calculation process in a vehicle discrimination apparatus according to a first embodiment of the present invention.
Figure 8:
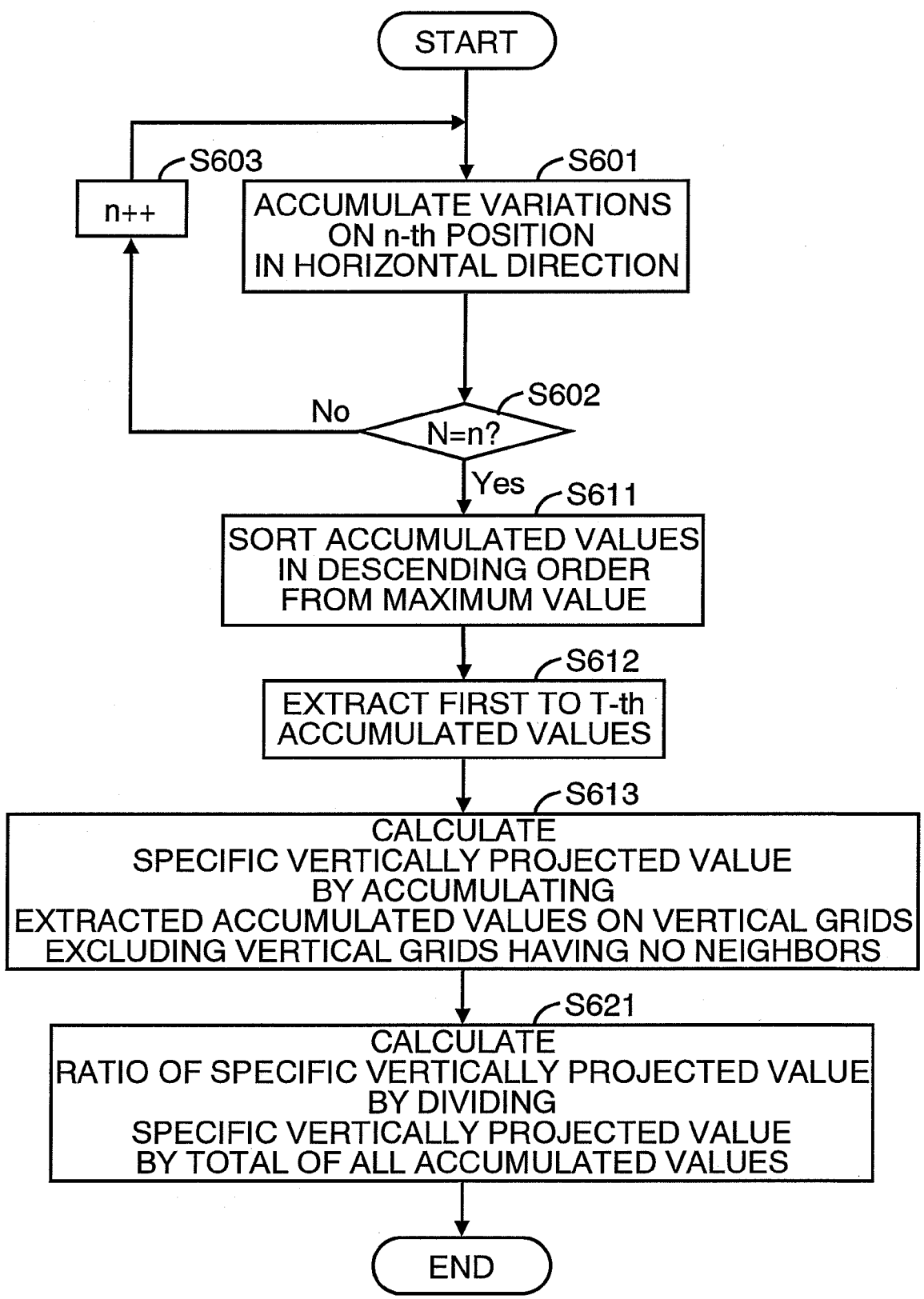
FIG. 8 is a diagram illustrating a flowchart in detail of a specific vertically projected value ratio calculation process of a vehicle discrimination apparatus according to a first embodiment of the present invention.

FIG. 6 is a diagram illustrating a flowchart of operations of a vehicle discrimination apparatus according to a first embodiment of the present invention. FIG. 7 is a diagram illustrating a flowchart in detail of a specific variation number calculation process in a vehicle discrimination apparatus according to a first embodiment of the present invention. FIG. 8 is a diagram illustrating a flowchart in detail of a specific vertically projected value ratio calculation process of a vehicle discrimination apparatus according to a first embodiment of the present invention.

The CPU 210 serves as the input manager 211 to receive a shot image from the imaging device 10 (operation S100). The imaging device 10 is able to transmit a shot image to the vehicle discrimination apparatus 200 in real time immediately after shooting an image. The imaging device 10 may transmit after shot an image a predetermined number of times or after predetermined time has elapsed.

The CPU 210 serves as the feature extractor 212 to convert the vertices of grids in the shot image and neighbors of the vertices of the grids, which are required for differential filter, from RGB components into I-components (operation S200).

The CPU 210 executes a smoothing process (operation S300). Various smoothing processes are known and conventional, and a person skilled in the art is able to appropriately implement the smoothing process, so that discussion thereof in detail is omitted. For example, as a smoothing filter, there is a filter of the following expression (4). Where n is larger than 1. Other than the above, there are a weighted average filter and a median filter. Note that in operation S200, I-components of neighboring pixels of the vertices of the grids, which are required for differential filter, are also obtained, so that the smoothing filter may be applied when n≧m, wherein the differential filter is n by n matrix and the smoothing filter is m by m matrix, respectively. When n<m, it is necessary to obtain I-components for smoothing filter in operation S200.

$$\begin{pmatrix} \frac{1}{n} & \frac{1}{n} & \frac{1}{n} \\ \frac{1}{n} & \frac{1}{n} & \frac{1}{n} \\ \frac{1}{n} & \frac{1}{n} & \frac{1}{n} \end{pmatrix} \quad (4)$$

In addition, the smoothing process is executed in operation S300; the smoothing process may be executed between operation S100 and operation S200, instead. In that case, the smoothing process may be executed on all the pixels of a shot image; instead, the smoothing process may be executed only on pixels used for differential filter, and operation S200 may be executed only on the pixels on which the smoothing process has been executed.

The CPU 210 serves as the differential filter applier 213 to apply differential filter on the extracted I-component data on which the smoothing process has been executed (operation S400). By so doing, variations at the vertices of each grid are obtained as filtered data.

Next, the CPU 210 executes a defined specific variation number calculation process in operation S500 and executes a defined specific vertically projected value ratio calculation process in operation S600. The detail of each process will be discussed later.

The CPU 210 serves as the vehicle discriminator 216 to discriminate whether the shot vehicle is a two-wheeled vehicle or a four-wheeled vehicle on the basis of the number of specific variations and the ratio of the specific vertically projected value, and then creates vehicle discrimination data (operation S700). Specifically, if the number of specific variations is smaller than or equal to the second threshold, it is determined to be an object other than a four-wheeled vehicle. If the number of specific variations is smaller than or equal to the fourth threshold and the ratio of the specific vertically projected value is larger than or equal to third threshold [%], it is determined to be a two-wheeled vehicle. The vehicle discrimination data includes a flag indicative of a type showing a two-wheeled vehicle or four-wheeled vehicle.

The CPU 210 serves as the output manager 217 to output the vehicle discrimination data to the management computer 30, which is an accumulation device, together with a shot image, shot time, and shooting location identifier (operation S800).

The management computer 30 accumulates the number of two-wheeled vehicles and the number of four-wheeled vehicles for each imaging device 10. Then, by subtracting the accumulated result of the imaging device 10 that shoots an exiting vehicle from the accumulated result of the imaging device 10 that shoots an entering vehicle, the number of vehicles that currently remain in the factory is displayed on the display unit 240 of the management computer 30 separately by two-wheeled vehicle and four-wheeled vehicle.

The CPU 210 serves as the specific variation number calculator 214 to extract a variation from the filtered data obtained by the differential filter applier 213 (operation S501) and determines whether the extracted variation is larger than or equal to n (operation S502). If it is larger than or equal to n, the number of specific variations is counted up (operation S503). If it is not larger than or equal to n, the process proceeds to the next. Next, it is determined whether the extracted variation is the last variation (operation S504). If it is the last variation, the process ends. If it is not the last variation, the process returns to operation S501.

The CPU 210 serves as the specific vertically projected value ratio calculator 215 to accumulate variations at the n-th position in horizontal direction. That is, the variations of the pixels on the n-th vertical grid line are accumulated (operation S601). The initial value of n is 1. The CPU 210 determines whether n is equal to N (operation S602). If it is not equal, n is incremented by 1 and the process returns to operation S601. If it is equal, the process proceeds to the next process.

The CPU 210 sorts the obtained accumulated values in descending order by absolute values of the accumulated values (operation S611).

The CPU 210 extracts the first to T-th accumulated values (operation S612). T may be arbitrarily set. In FIG. 4, T is 2, for example.

The CPU 210 excludes the accumulated value of the vertical grid line that is not successive among the vertical grid lines of the extracted accumulated values and then accumulates the accumulated values to obtain a specific vertically projected value (operation S613). When an object, which is a four-wheeled vehicle or a two-wheeled vehicle, is present in a shot image, the object continuously occupies a certain area and is not separated in the shot image, so that it is possible to remove noise by not adding the accumulated value of the grid line that is not successive. For example, in FIG. 4, the grid points on the third vertical grid line and fourth vertical grid line overlap the two-wheeled vehicle and the driver of the two-wheeled vehicle, so that either the accumulated value of the third vertical grid line or the accumulated value of the fourth vertical grid line is normally the first or the second largest accumulated value. Even when the first vertical grid line becomes the vertical grid line having the second largest accumulated value due to noise, the accumulated value is not added owing to operation S613. Here, to obtain T accumulated values, it may be configured to extract a successive accumulated value in a place later than the T-th place. By so doing, taking the above discussed FIG. 4 for instance, the accumulated value of the third vertical grid line or the accumulated value of the fourth vertical grid line is accumulated to obtain a specific vertically projected value. Alternatively, it is possible to obtain a specific vertically projected value by accumulating the accumulated values of T vertical grid lines that are successive in the lateral direction, including the vertical grid line having the largest accumulated value located at the middle.

The CPU 210 divides the specific vertically projected value by the value obtained by accumulating all the accumulated values to thereby obtain the ratio of the specific vertically projected value (operation S621).

As discussed above, according to the vehicle discrimination apparatus of the first embodiment of the present invention, I-components of specific points are extracted from a shot image that is shot by the imaging devices 10, the differential filter is applied to the extracted I-components, the number of specific variations and the ratio of the specific vertically projected value are obtained. Then it is possible to discriminate a vehicle present in the shot image as a two-wheeled vehicle or a four-wheeled vehicle on the basis of whether the obtained number of specific variations and the ratio of the specific vertically projected value satisfy a predetermined condition. Particularly, pixels on which image processing is executed are limited to specific pixels within a shot image, so that it is possible to discriminate a vehicle at high speed.

Table 1 (for four-wheeled vehicle) and Table 2 (for two-wheeled vehicle) were obtained in such a manner that the variation in depth of each grid point was actually obtained from the shot image shown in FIG. 4 in which the two-wheeled vehicle was shot and the shot image shown in FIG. 5 in which the four-wheeled vehicle was shot and then the percentage of each variation to the entire variation in depth was obtained. Note that FIG. 4 and FIG. 5 are line drawings; actually, they are RGB images and the experiment was carried out on the RGB images. A value at the n-row and m-column of each table is percentage of the variation in depth of the pixel located at the intersection of the n-th horizontal grid line and the m-th vertical grid line.

TABLE 1

| 0.284126 | 0 | 0 | 0 | 2.607152 |
| 8.338249 | 19.72704 | 1.340217 | 13.53404 | 0.710314 |
| 11.61036 | 14.08823 | 6.864146 | 13.03406 | 1.193665 |
| 0.36219 | 1.270648 | 0.508259 | 0 | 0.224621 |
| 1.395545 | 0.985264 | 1.125797 | 0.525824 | 0.483848 |

TABLE 2

| 0.984774 | 0.755287 | 0.385122 | 8.113625 | 0.955371 |
| 0.151057 | 0.912617 | 1.250223 | 21.68345 | 0.834242 |
| 1.290635 | 2.026648 | 10.51125 | 35.54763 | 1.068137 |
| 1.761617 | 0.544645 | 1.555231 | 0.385122 | 1.051993 |
| 0.967239 | 2.120192 | 0.534069 | 2.61857 | 2.567976 |

TABLE 3

| 2.891278 |
| 43.64986 |
| 46.79046 |
| 2.365718 |
| 4.516278 |

TABLE 4

| 11.19418 |
| 24.83159 |
| 50.4443 |
| 5.298608 |
| 8.808046 |

Table 3 and Table 4 contain a total of each row of Table 1 and Table 2, respectively. When the maximum value of the percentage of the variation in depth is obtained from each of Table 1 and Table 2, the ratio of the maximum value, alone in the row that contains the maximum value, shows 45.19382 for the four-wheeled vehicle and 70.46907 for the two-wheeled vehicle. Thus, the resulted values are sufficiently apart from each other to make it possible to perform discrimination.

Other Embodiments

Method of Calculating Specific Vertically Projected Value by Using Grouping

Figure 9:
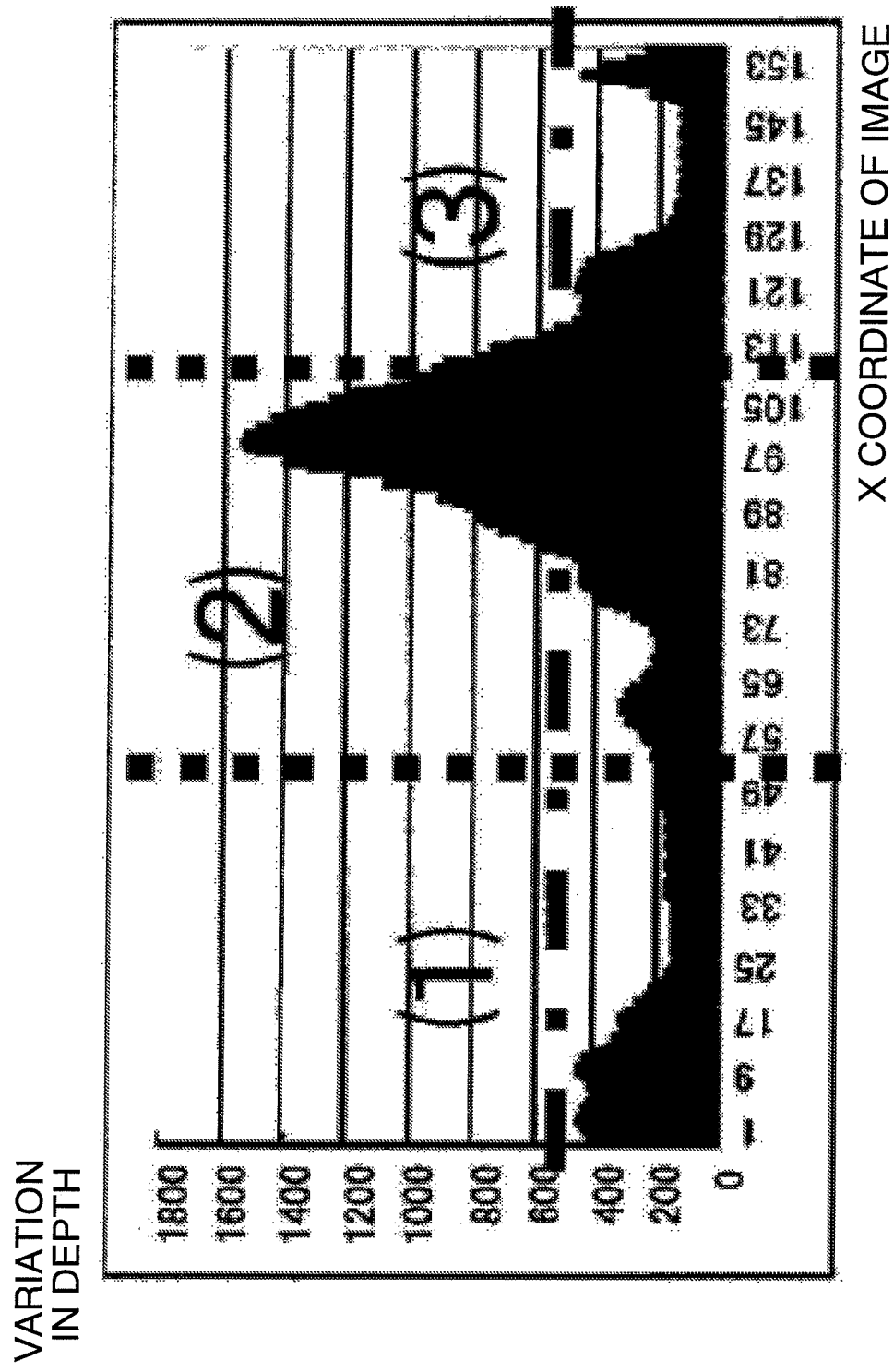
FIG. 9 is a diagram illustrating a graph that shows values calculated by vertically projecting variations of all horizontal pixels on grid lines at respective positions in horizontal direction according to another embodiment.
Figure 10:
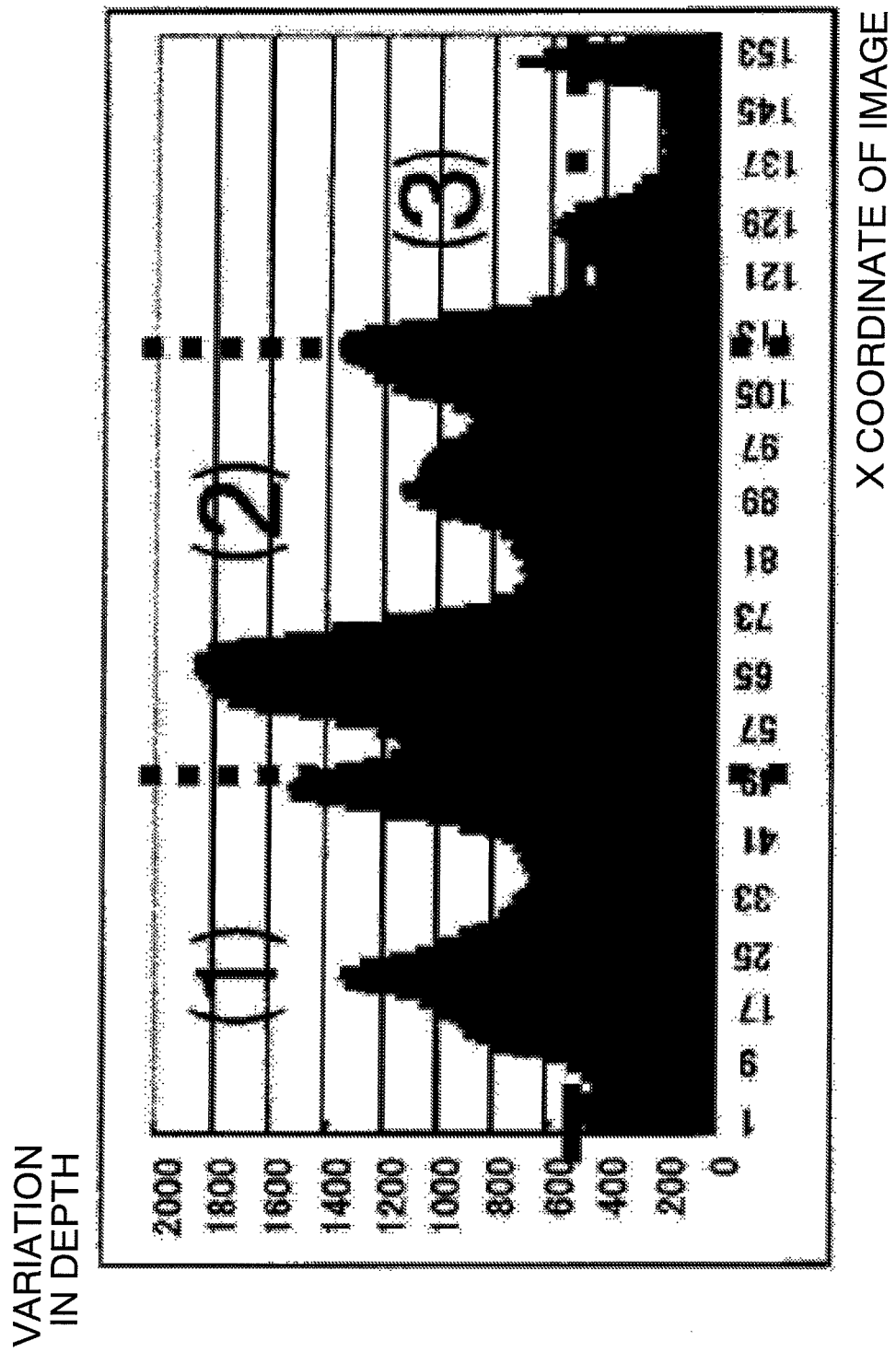
FIG. 10 is a diagram illustrating a graph that shows values calculated by vertically projecting variations in all horizontal pixels on grid lines at respective positions in horizontal direction according to another embodiment.

FIG. 9 and FIG. 10 are diagrams illustrating a graph that shows values calculated by vertically projecting variations of all horizontal pixels on grid lines at respective positions in horizontal direction according to another embodiment. FIG. 9 is related to a two-wheeled vehicle. FIG. 10 is related to a four-wheeled vehicle.

The first embodiment discriminates a vehicle using variations of skipped pixels located on the horizontal grid lines. That is, the variations of the pixels located at positions corresponding to intersections of the horizontal grid lines and the vertical grid lines are used. FIG. 9 and FIG. 10 show vertically projected variations of all the pixels located on the horizontal grid lines. In other words, this corresponds to a case where vertical grid lines corresponding to the number of pixels located in the lateral direction are provided. As is apparent with reference to FIG. 9 and FIG. 10, in a case of a two-wheeled vehicle, one large peak is formed and the variations concentrate on a certain portion in width direction, whereas in a case of a four-wheeled vehicle, a plurality of peaks are formed and the variations are dispersed. This supports the theory of the present invention discussed in the first embodiment in regard to the ratio of the specific vertically projected value.

In the specific vertically projected value ratio calculation process of the first embodiment, the previously determined number of successive vertically projected values among the vertically projected values are accumulated in descending order to obtain the specific vertically projected value. Instead, it is applicable that, as shown in FIG. 9 and FIG. 10, a plurality of straight lines parallel to the Y-axis direction are drawn, variations in each area defined by the straight lines are accumulated, the largest accumulated value is determined as the specific vertically projected value, and then the specific vertically projected value is divided by the entire variation to thereby obtain the ratio of the specific vertically projected value.

That is, the vertically projected values are divided into predetermined number of groups so that line segments, each of which passes through the pixels included in the same vertically projected value, are successive, the vertically projected values are accumulated in each group, the ratio of the specific vertically projected value, which is an accumulated value of the vertically projected values in the group having the maximum accumulated value, to the entire variation is obtained to thereby make it possible to discriminate a vehicle on the basis of the ratio.

In the first embodiment, a differential value is obtained by using a differential filter; instead, a differential value may be obtained by using a Fourier transformation. For example, it may be obtained by performing a Fourier transformation on a shot image, removing low-frequency components to obtain only high-frequency components, and then performing an inverse Fourier transformation thereon.

A specific variation point is a point at which a two-wheeled vehicle, four-wheeled vehicle, or the like, is estimated to be present. A two-wheeled vehicle, four-wheeled vehicle, or the like, continuously occupies a specific area within a shot image, and is not separately present. Thus, a specific variation point that is located a predetermined distance or more away from specific variation points forming a certain group does not indicate a point at which a two-wheeled vehicle, four-wheeled vehicle, or the like, is present, and it is highly likely to be noise. That is, ignoring such a specific variation point that is located a predetermined distance or more away to execute vehicle discrimination allows further accurate vehicle discrimination. This is preferably executed between operation S400 and operation S500. Here, it is discussed "a specific variation point that is located a predetermined distance or more away from specific variation points forming a certain group"; instead, it may be "a specific variation point located a predetermined distance or more away from the closest specific variation point".

Here, a distance between the specific variation points is obtained to determine whether they are located a predetermined distance or more away from each other to thereby specify the specific variation point located separately; instead, a clustering method may be employed. As for the clustering method, known clustering methods may be employed, for example, a K-means method (reference: "Handbook of Image Analysis [Revised Edition]," pp. 1577-1579, Mikio TAKAGI, Haruhisa SHIMODA, University of Tokyo Press). That is, it may be configured so that, among clusters formed using the clustering method, a cluster having small number of elements, e.g., only one element, or the like, is specified and the element of that cluster is ignored as a separately located specific variation point.

The present invention may be embodied in many different forms. Thus, it should not be interpreted only through the discussion of the above discussed embodiments. The above discussed embodiments do not list features that are essential to the present invention; the present invention also encompasses sub-combinations of these plurality of features.

In the embodiments, an apparatus has been mainly discussed; however, as is apparent to a so-called person skilled in the art, the present invention may also be implemented as a system, a method, or a program that can be used in a computer. In addition, the present invention may be implemented as an embodiment of hardware, software, or software and hardware. The program may be recorded in any computer readable medium, such as a hard disk, a CD-ROM, a DVD-ROM, an optical storage device, or a magnetic storage device. Furthermore, the program may be recorded in another computer through a network.

The present invention is discussed through the above embodiments; however, the technical scope of the present invention is not limited to the range discussed in the embodiments and various modifications or improvements may be applied to these embodiments. The technical scope of the present invention also encompasses embodiments to which such modifications or improvements are applied. This is apparent from CLAIMS and Technical Solution.

What is claimed is:

1. A vehicle discrimination apparatus for discriminating a vehicle on the basis of an image of the vehicle, the vehicle discrimination apparatus comprising:
   a processor to
      determine grid points on the image, the grid points being pixels defined as vertices of grids formed by predefined vertical grid lines and predefined horizontal grid lines;
   extract intensity components of pixels corresponding to the determined grid points and neighboring pixels thereof, the neighboring pixels not being vertices of grids formed by the predefined vertical grid lines and the predefined horizontal grid lines;
   apply a differential filter on values of the extracted intensity components to obtain variations in the intensity components of pixels corresponding to the grid points, and discriminate the vehicle on the basis of data derived from the obtained variations in the intensity components of the pixels corresponding to the grid points;

wherein the processor further calculates a specific vertically projected value ratio by accumulating along the vertical grid lines the obtained variations-to obtain vertically projected values, extracting a predefined number of the vertically projected values in descending order, accumulating, among the vertically projected values extracted, the vertically projected values accumulated along adjacent vertical grid lines to obtain a specific vertically projected value, and obtaining, as the specific vertically projected value ratio, a ratio of the specific vertically projected value against an accumulated value of variations in the intensity components of pixels corresponding to all the grid points, and the processor discriminates the vehicle on the basis of the obtained specific vertically projected value ratio.

2. The vehicle discrimination apparatus of claim 1, wherein the processor discriminates that the vehicle is a two-wheeled vehicle when the obtained specific vertically projected value ratio is larger than or equal to a predefined ratio threshold.

3. The vehicle discrimination apparatus of claim 1, wherein the processor further calculates a specific variation number by counting the number of variations having values larger than or equal to a predefined first threshold among the obtained variations, and the processor discriminates the vehicle on the basis of the calculated specific variation number as well as the obtained specific vertically projected value ratio.

4. The vehicle discrimination apparatus of claim 3, wherein the processor discriminates that the vehicle is a two-wheeled vehicle when the obtained specific vertically projected value ratio is larger than or equal to a predefined ratio threshold, and the processor discriminates that the vehicle is a four-wheeled vehicle when the calculated specific variation number is larger than or equal to a predefined second threshold.

5. A vehicle discrimination apparatus for discriminating a vehicle on the basis of an image of the vehicle, the vehicle discrimination apparatus comprising:

a processor to determine grid points on the image, the grid points being pixels defined as vertices of grids formed by predefined vertical grid lines and predefined horizontal grid lines;

extract intensity components of pixels corresponding to the determined grid points and neighboring pixels thereof, the neighboring pixels not being vertices of grids formed by the predefined vertical grid lines and the predefined horizontal grid lines;

apply a differential filter on values of the extracted intensity components to obtain variations in the intensity components of pixels corresponding to the grid points; and discriminate the vehicle on the basis of data derived from the obtained variations in the intensity components of the pixels corresponding to the grid points;

wherein the processor further calculates a specific variation number by counting the number of variations having values larger than or equal to a predefined first threshold among the obtained variations, and the processor discriminates the vehicle on the basis of the calculated specific variation number.

6. The vehicle discrimination apparatus of claim 5, wherein the processor discriminates that the vehicle is a four-wheeled vehicle when the calculated specific variation number is larger than or equal to a predefined second threshold.

7. A vehicle discrimination method executed by a vehicle discrimination apparatus for discriminating a vehicle on the basis of an image of the vehicle, the vehicle discrimination method comprising:

determining grid points on the image by the vehicle discrimination apparatus, the grid points being pixels defined as vertices of grids formed by predefined vertical grid lines and predefined horizontal grid lines;

extracting intensity components of pixels corresponding to the determined grid points and neighboring pixels thereof, the neighboring pixels not being vertices of grids formed by the predefined vertical grid lines and the predefined horizontal grid lines;

applying a differential filter on values of the extracted intensity components to obtain variations in the intensity components of pixels corresponding to the grid points; and discriminating the vehicle on the basis of data derived from the obtained variations in the intensity components of the pixels corresponding to the grid points; and calculating a specific vertically projected value ratio by accumulating along the vertical grid lines the obtained variations to obtain vertically projected values, extracting a predefined number of the vertically projected values in descending order, accumulating, among the vertically projected values extracted, the vertically projected values accumulated along adjacent vertical grid lines to obtain a specific vertically projected value, and obtaining, as the specific vertically projected value ratio, a ratio of the specific vertically projected value against an accumulated value of variations in the intensity components of pixels corresponding to all the grid points, wherein the vehicle discrimination apparatus discriminates the vehicle on the basis of the obtained specific vertically projected value ratio.

8. The vehicle discrimination method of claim 7, further comprising:

calculating a specific variation number by counting the number of variations having values larger than or equal to a predefined first threshold among the obtained variations, wherein the vehicle discrimination apparatus discriminates the vehicle on the basis of the calculated specific variation number as well as the obtained specific vertically projected value ratio.

9. A vehicle discrimination method executed by a vehicle discrimination apparatus for discriminating a vehicle on the basis of an image of the vehicle, the vehicle discrimination method comprising:

determining grid points on the image by the vehicle discrimination apparatus, the grid points being pixels defined as vertices of grids formed by predefined vertical grid lines and predefined horizontal grid lines;

extracting intensity components of pixels corresponding to the determined grid points and neighboring pixels thereof, the neighboring pixels not being vertices of grids formed by the predefined vertical grid lines and the predefined horizontal grid lines;

applying a differential filter on values of the extracted intensity components to obtain variations in the intensity components of pixels corresponding to the grid points;

discriminating the vehicle on the basis of data derived from the obtained variations in the intensity components of the pixels corresponding to the grid points; and calculating a specific variation number by counting the number of variations having values larger than or equal to a predefined first threshold among the obtained variations, wherein the vehicle discrimination apparatus discriminates the vehicle on the basis of the calculated specific variation number.

10. A computer-readable, non-transitory medium storing a vehicle discrimination program that causes a computer to execute a vehicle discrimination method for discriminating-a vehicle on the basis of an image of the vehicle, the vehicle discrimination method comprising:

determining grid points on the image, the grid points being pixels defined as vertices of grids formed by predefined vertical grid lines and predefined horizontal grid lines;

extracting intensity components of pixels corresponding to the determined grid points and neighboring pixels thereof, the neighboring pixels not being vertices of grids formed by the predefined vertical grid lines and the predefined horizontal grid lines;

applying a differential filter on values of the extracted intensity components to obtain variations in the intensity components of pixels corresponding to the grid points;

discriminating the vehicle on the basis of data derived from the obtained variations in the intensity components of the pixels corresponding to the grid points; and calculating a specific vertically projected value ratio by
accumulating along the vertical grid lines the obtained variations to obtain vertically projected values,
extracting a predefined number of the vertically projected values in descending order,
accumulating, among the vertically projected values extracted, the vertically projected values accumulated along adjacent vertical grid lines to obtain a specific vertically projected value, and
obtaining, as the specific vertically projected value ratio, a ratio of the specific vertically projected value against an accumulated value of variations in the intensity components of pixels corresponding to all the grid points, wherein the computer discriminates the vehicle on the basis of the obtained specific vertically projected value ratio.

11. The computer-readable, non-transitory medium of claim 10, the vehicle discrimination method further comprising:

calculating a specific variation number by counting the number of variations having values larger than or equal to a predefined first threshold among the obtained variations, wherein the computer discriminates the vehicle on the basis of the calculated specific variation number as well as the obtained specific vertically projected value ratio.

12. A computer-readable, non-transitory medium storing a vehicle discrimination program that causes a computer to execute a vehicle discrimination method for discriminating-a vehicle on the basis of an image of the vehicle, the vehicle discrimination method comprising:

determining grid points on the image, the grid points being pixels defined as vertices of grids formed by predefined vertical grid lines and predefined horizontal grid lines;

extracting intensity components of pixels corresponding to the determined grid points and neighboring pixels thereof, the neighboring pixels not being vertices of grids formed by the predefined vertical grid lines and the predefined horizontal grid lines;

applying a differential filter on values of the extracted intensity components to obtain variations in the intensity components of pixels corresponding to the grid points;

discriminating the vehicle on the basis of data derived from the obtained variations in the intensity components of the pixels corresponding to the grid points; and calculating a specific variation number by counting the number of variations having values larger than or equal to a predefined first threshold among the obtained variations, wherein the computer discriminates the vehicle on the basis of the calculated specific variation number.

* * * * *